(12) United States Patent
Lu

(10) Patent No.: US 7,720,032 B2
(45) Date of Patent: *May 18, 2010

(54) METHOD AND APPARATUS FOR PRIORITY MANAGEMENT OF SYSTEM ALGORITHMS IN REAL TIME

(75) Inventor: Guang Lu, Verdun (CA)

(73) Assignee: InterDigital Technology Corporation, Wilmington, DE (US)

( * ) Notice: Subject to any disclaimer, the term of this patent is extended or adjusted under 35 U.S.C. 154(b) by 1728 days.

This patent is subject to a terminal disclaimer.

(21) Appl. No.: 10/875,938

(22) Filed: Jun. 24, 2004

(65) Prior Publication Data

US 2004/0228344 A1    Nov. 18, 2004

Related U.S. Application Data

(63) Continuation of application No. 10/419,471, filed on Apr. 21, 2003, now Pat. No. 6,771,624.

(60) Provisional application No. 60/417,529, filed on Oct. 10, 2002.

(51) Int. Cl.
   *H04B 1/10* (2006.01)
(52) U.S. Cl. .................................... 370/332; 370/465
(58) Field of Classification Search ................ 370/332, 370/465
   See application file for complete search history.

(56) References Cited

U.S. PATENT DOCUMENTS

| | | | |
|---|---|---|---|
| 5,349,649 | A | 9/1994 | Iijima |
| 5,767,785 | A | 6/1998 | Goldberg |
| 5,956,644 | A * | 9/1999 | Miller et al. ................. 455/453 |
| 6,122,293 | A | 9/2000 | Frodigh et al. |
| 6,134,230 | A | 10/2000 | Olofsson et al. |
| 6,449,251 | B1 | 9/2002 | Awadallah et al. |
| 6,452,915 | B1 | 9/2002 | Jorgensen |
| 6,453,360 | B1 | 9/2002 | Muller et al. |
| 6,590,885 | B1 | 7/2003 | Jorgensen |
| 2002/0065076 | A1 | 5/2002 | Monroe |
| 2002/0078211 | A1 | 6/2002 | Natarajan et al. |

* cited by examiner

*Primary Examiner*—Jason E Mattis
(74) *Attorney, Agent, or Firm*—Volpe and Koenig P.C.

(57) ABSTRACT

A method for management of real-time system algorithms to achieve optimal efficiency which provides for dynamically managing priorities in a complex real-time system, considering the dynamic requirements of the system. A preferred embodiment describes the management of a plurality of RRM algorithms, including algorithms for SCC escape, LM escape, SCC rate control, and F-DCA background. More specifically, one exemplary embodiment assists in deciding: when to increase algorithm priorities, how to increase/decrease algorithm priorities, how to assign priority parameters, and how to dynamically manage priorities in the system, to result in optimal system efficiency.

17 Claims, 2 Drawing Sheets

METHOD AND APPARATUS FOR PRIORITY MANAGEMENT OF SYSTEM ALGORITHMS IN REAL TIME

CROSS REFERENCE TO RELATED APPLICATION(S)

This application is a continuation of U.S. patent application Ser. No. 10/419,471, filed Apr. 21, 2003, which claims the benefit of U.S. provisional application No. 60/417,529, filed on Oct. 10, 2002, which are incorporated by reference as if fully set forth.

FIELD OF INVENTION

This invention relates generally to complex real time systems in wireless communications, and more particularly to a method for dynamically managing the priority of system algorithms to achieve optimal efficiency.

BACKGROUND

The following are expansions for certain acronyms used in this application:

| | |
|---|---|
| SCC | slow congestion control |
| F-DCA | fast dynamic channel allocation |
| LM | link maintenance |
| C-RNC | controlling network controller |

There is an ever-increasing need to achieve enhanced efficiency of operation in complex communication systems, and, the need is even greater in management of real time systems that use a plurality of algorithms.

In complex real-time systems, it is desirable to use priority-handling mechanisms on processes to achieve optimal efficiency. The RRM (Radio Resource Management) algorithms fall into the above category. Traditional fixed-priority handling mechanisms work well in small and stable systems. However, the wireless communication environment is very dynamic and complex. It is necessary and beneficial that the execution priority of the algorithms can be changed according to the most current system status.

Prior art offers information in patent publications that deal with operating system scheduling and packet scheduling, for example. The following are examples of US patents generally in the field of networks:

In U.S. Pat. No. 6,453,360, titled "High Performance Network Interface", a high performance network interface is provided for receiving a packet from a network and transferring it to a host computer system. A header portion of a received packet is parsed by a parser module to determine the received packet's compatibility with, or conformance to, one or more pre-selected protocols. Packets are stored in multiple queues with priorities.

U.S. Pat. No. 6,452,915, titled "IP-flow Classification in a Wireless Point To Multi-Point (PTMP) Transmission System", is directed to an IP-flow classification system used in a wireless telecommunications system. More specifically, the IP flow classification system in said U.S. patent provides for grouping IP-flows from a packet-centric wireless point to a multi-point telecommunications system. A quality of service (QoS) grouping device therein may include an optional differentiated services (Diff-Serv) device that takes into account an optional Diff-Serv field priority-marking for the IP-flow.

In U.S. Pat. 6,449,251, titled "Packet Mapper for Dynamic Data Packet Prioritization", a packet-mapper maps streams of data packets in a computer network, each data packet having a packet header containing feature values descriptive of the data packet. The packet-mapper includes a mapping table that associates application-related feature values with network-reserved feature values from a range of feature values reserved for use by selected network data packet streams. Prioritization in said US Patent is achieved by assigning a port-number for packets.

The above examples of US patent publications are, however, not directly applicable to management of and scheduling between different RRM algorithms, and do not take into account system status.

It is desirable to provide a method of dynamically managing system algorithms, e.g., RRM algorithms, so as to achieve optimal efficiency.

SUMMARY

The present invention provides a method of dynamically managing system algorithms in wireless communications, considering system status in real time. The present invention recognizes that in general, in complex real-time systems such as wireless systems, it is very desirable to use priority-handling mechanisms on the processes to achieve optimal efficiency. RRM is a collection of relatively independent algorithms whose common purpose is to manage the scarce radio resources efficiently. For example, although the purpose of each RRM algorithm may be somewhat independent of the other, the algorithms may end up acting on similar objects (e.g., one algorithm may want to reduce the rate of the link, whereas another may want to move it to another timeslot). To achieve optimal results, the algorithms should be executed in a timely manner. However, it is not efficient for the algorithms to be running at the same time trying to solve the same problem. Moreover, the best solution at one time may not be the best solution at another time due to the quick and unpredictable changes of system status and system-performance in the wireless environment.

The present inventive method of dynamic priority management provides an efficient way to prioritize different algorithms in a fast changing environment. It can be applied to, but is not limited to the RRM system. The inventive method is general and targets different types of complex and dynamic real-time systems.

As described hereinafter, a preferred embodiment provides a method for dynamic priority management of system algorithms. It is especially suitable for large, complex and dynamic systems such as wireless communication systems. Specifically, the following aspects of the inventive method are addressed hereinafter:

a) when to increase or decrease algorithm priorities, b) how to increase or decrease algorithm priorities, c) how to assign priority parameters, and d) how to dynamically manage priorities in the system.

The inventive method provides at least the following advantages:

avoidance of the higher priority algorithms always triggering above lower priority algorithms even though they are not the best candidates to solve a problem under certain circumstances, and the ability to change priorities of the algorithms according to the latest system status and performance so that algorithms are executed in an optimal order and in a timely manner.

BRIEF DESCRIPTION OF THE FIGURES

A more detailed understanding of the invention may be had from the following description of a preferred embodiment, given by way of example and to be understood in conjunction with the accompanying drawings wherein.

DETAILED DESCRIPTION OF THE PREFERRED EMBODIMENT(S)

Figure 1:
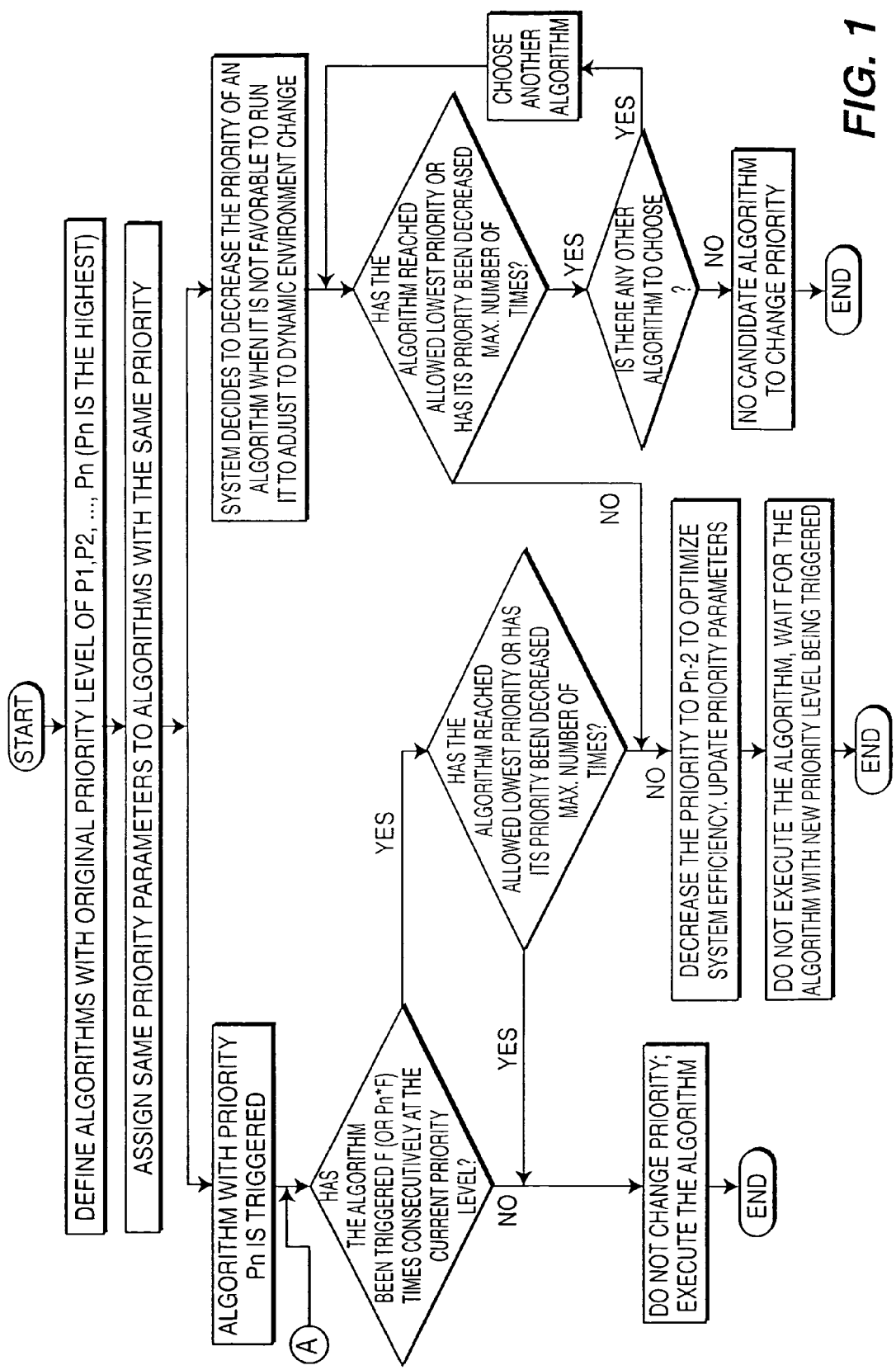
FIG. 1 is a flowchart showing the process steps applicable to the preferred embodiment, to illustrate the decrease of priority; and, FIG. 2 is a flowchart showing the process steps applicable to the preferred embodiment, to illustrate the increase of priority.

Described hereinafter is a preferred embodiment of the inventive method of managing RRM algorithms, as an example, for obtaining optimum efficiency. For managing a plurality of algorithms, the following exemplary method steps may be noted:

a) define algorithm priority levels as $P_1, P_2, \ldots, P_n$ (1...n are consecutive integers), where $P_n$ has the highest priority. These predefined priority levels are the original priority designations for each algorithm, and b) define the same priority parameters for algorithms within the same priority level. Priority parameters are those parameters that affect the trigger of an algorithm and they vary in different systems. In the RRM system, the priority parameters can include thresholds, filtering of a measurement, 'n' out of 'm' measurements that trigger an algorithm, and an algorithm periodical timer.

In a normal situation, the algorithms should be executed in the order of $P_n, P_{n-1}, \ldots,$ and $P_1$ if they are triggered at the same time.

If, after the execution(s) of an algorithm, the problem is not solved (e.g., measurement exceeds threshold again), the priority of the algorithm should be decreased so that algorithms with lower priority can take action.

The method to decrease priority is:

c) When to decrease the algorithm priority:

There can be multiple reasons to decrease a priority level of an algorithm:

aa. Decrease the priority to optimize interaction of the algorithms.

Option 1: A simple approach is to define a fixed parameter for all algorithms of all priority levels, as F.F is the number of consecutive times that the algorithm failed to solve the problem. After F times of the execution, the priority of the algorithm should be decreased as described in step (d) below.

Option 2: Use the priority level $P_n$ as a weight parameter. F is the number of consecutive times that the algorithm failed to solve the problem. The priority of the algorithm decreases after $P_n$*F times' 0 execution. This is to provide algorithms with higher priority a "higher priority" to stay in their current priority, so that there are more chances that higher priority algorithms solve the problem.

ab. Decrease the priority of an algorithm when it is undesirable to execute it. An example is to adjust algorithm priorities when the system environment has changed. Most likely the change will be reflected in measurement results. The priority of an algorithm can be decreased when a certain measurement has crossed a threshold and the algorithm is not a favorable candidate under this situation.

d) Decrease the priority level by 2, i.e., an algorithm with priority of $P_n$ will have priority of $P_{n-2}$. This is to allow algorithms with priority level $P_{n-1}$ to be executed.

e) Theoretically, there is no limit on how many times the priority can be decreased. Practically, there should be a design parameter to define the maximum number of decreases, or to define the lowest priority level that an algorithm can be assigned.

f) When an algorithm has been decreased by the maximum number of times, or it has reached its minimum priority level, the priority change should be stopped.

g) In case there is more than one algorithm with the same priority to be executed, the algorithms are chosen on a "first come, first serve" basis.

Once the priority of an algorithm is decreased, it should be restored, i.e., increased back, under certain circumstances. The increase of the priority is similar to the decrease thereof except that it is in the reverse order.

The method to increase the algorithm priority:

h) When to increase the algorithm priority:

a. Priority was decreased using step (c) aa

Option 1: Increase the priority when the algorithm has been triggered again for the Nth time after it has been decreased (n=1, 2 ...).

Option 2: Use the original priority level $P_n$ as a weight parameter. N is the number of times that the algorithm has been triggered again. The priority of the algorithm increases after $N/P_n$ times' execution. This is to provide algorithms with higher priority a "higher priority" to go back to or toward their original priority.

b. Priority was decreased using step (c) ab

Increase the priority of an algorithm when it is desirable.

i) Increases the priority level by 2, i.e., restore to the last priority level.

j) Increase of priority stops when it has reached the original priority of the algorithm.

k) In case there is more than one algorithm with the same priority to be executed, the algorithms are chosen on a "first come, first serve" basis.

l) Priority is increased after time T has been decreased. T is a design parameter. The time should be relatively long, for example, greater than the time interval of n times' executions of the algorithm. This is to make sure that an algorithm does not stay with priority lower than its original one in case it is not triggered for a long time.

The following is an example of the application of the inventive method for management and priority handling of the RRM algorithms.

Example: Assign priorities of the RRM algorithms as follows. This is the original priority of the algorithms under a normal situation. Note that algorithms within the same priority level have the same priority parameters, for example, the thresholds, the filtering of a measurement, the "n" out of "m" measurements that trigger the algorithm.

TABLE 1

Priority of C-RNC RRM Algorithms

| Priority Level | Algorithms in C-RNC |
|---|---|
| $P_3$ (highest) | SCC Escape, LM Escape |
| $P_2$ (medium) | SCC Rate Control |
| $P_1$ (lowest) | F-DCA Background |

Figure 2:
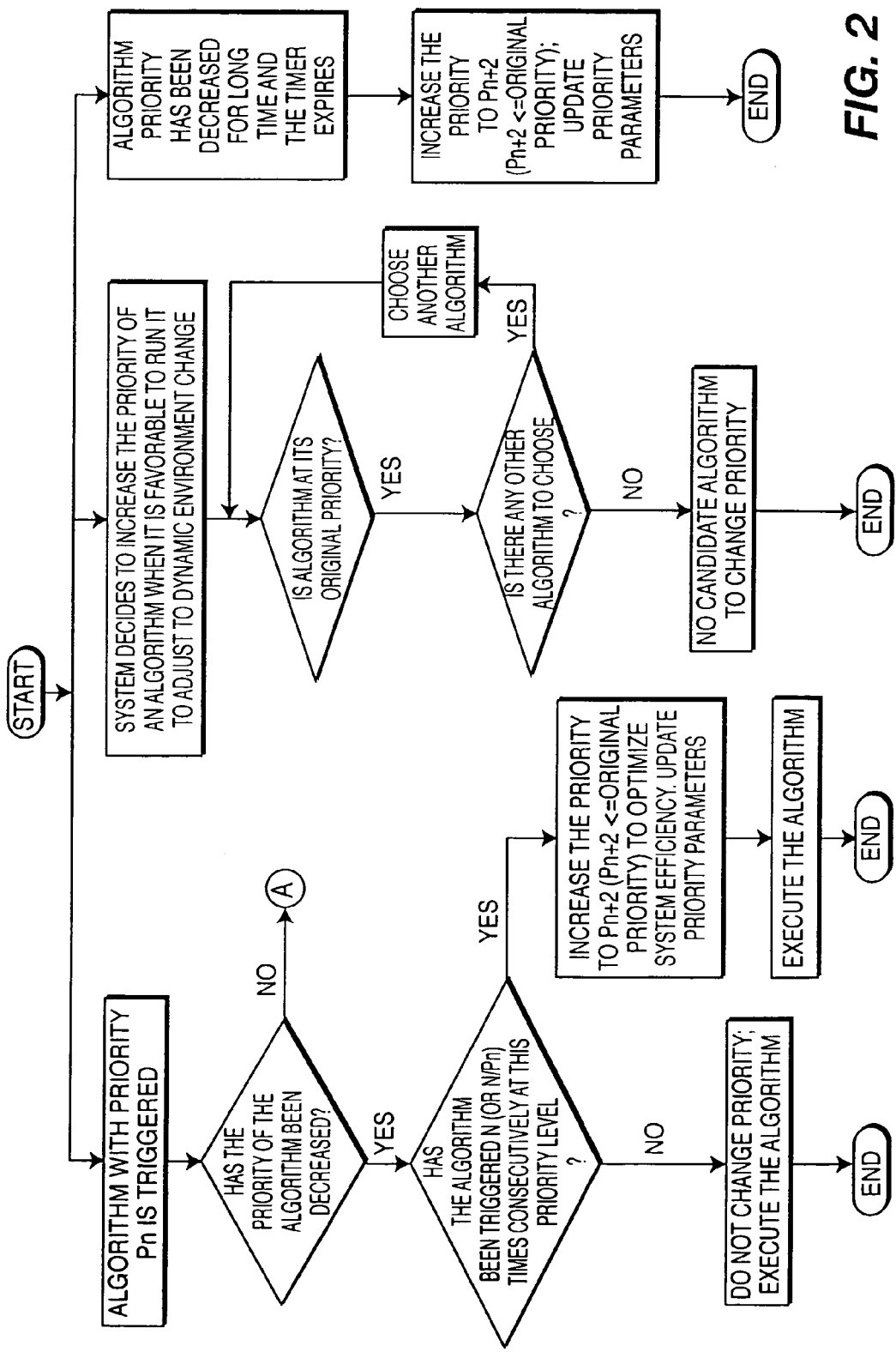

FIGS. 1 and 2 illustrate flowcharts of the operation using the guidelines for priority increase and decrease as set forth above. It is to be noted that the decision to increase or decrease is associated with the point (A) in the diagrams, which are separated for clarity. The steps in the two flow-charts are self-explanatory. Two scenarios are addressed in the following description.

Scenario 1:

SCC Escape and SCC Rate Control work on a cell-basis. SCC Escape algorithm may be given a higher priority since it is designed to solve current problems (interference, power). SCC Rate Control may be given a lower priority since it is designed to take proactive action to avoid cell congestion.

Define that at priority level 3, SCC Escape algorithm is triggered whenever it receives a bad measurement, and the measurement may be reported every 500 ms, for example. At priority level 2, SCC Rate Control algorithm, may be triggered every 3 seconds, for example.

If the SCC Escape algorithm cannot solve the problem after it is triggered once (here it is assumed that F is 1), its priority is decreased to 1, and it is assumed that it will be triggered 8 out of 10 measurements. So it may be triggered at least every 5 seconds, for example. This gives the SCC Rate Control algorithm the chance to take action over the SCC Escape algorithm.

If after the priority decrease, SCC Escape algorithm and SCC Rate Control algorithm are triggered at the same time, the SCC Rate Control algorithm is given higher priority to run since its priority level is higher.

If the SCC-Escape algorithm is triggered at priority level 1 (which means that the system may be experiencing a really bad quality), its priority should be increased to 3 so that it will be triggered more frequently.

If the SCC-Escape algorithm is not triggered for a period of time T (it means the system recovers after other algorithms take action), its priority should be increased back to 3.

Scenario 2:

F-DCA background is designed to equalize the load of the timeslots and optimize system performance. It is not desirable to run the system when it is overloaded. By dynamically decreasing the priority of the F-DCA background (which may go below 0–), its chances of running reduce, so that other higher priority algorithms will have a chance to operate on the resources.

The foregoing is a description of a preferred embodiment and an exemplary application of the invention to the RRM scenario, wherein, an optimal dynamic management of the algorithms, e.g., SCC Escape, LM Escape, SCC Rate Control, and F-DCA Background algorithms, achieves an optimal efficiency.

Even though the example hereinabove makes references to RRM algorithms, it is to be understood that the inventive concept of dynamic management of system-algorithms is applicable to other scenarios as well.

What is claimed is:

1. Apparatus for selecting an algorithm from a plurality of algorithms employed in a wireless communications system, each algorithm being provided to cure or ease a particular condition, comprising:
   a unit for assigning a priority level, taken from priority levels $P_1, P_2, P_3 \ldots P_n$, to each algorithm wherein priority level $P_n$ is a highest priority level;
   a unit for assigning a parameter to each algorithm wherein a same parameter is assigned to algorithms of a same priority level;
   a unit for selecting an algorithm wherein, when two or more algorithms are associated with a given condition, that algorithm having a higher priority is selected;
   an accumulator for accumulating a number of times an algorithm has been consecutively selected and has failed to solve a problem;
   a unit for retaining a priority level assigned to the selected algorithm when the number accumulated by the accumulator is less than a given number;
   a unit for lowering a priority level of the selected algorithm when it has been consecutively selected said given number of times and its priority level has not been lowered below a lowest allowed priority; and
   a unit for retaining for use the selected algorithm regardless of the given number of times it has failed to solve a problem.

2. The apparatus of claim 1 wherein the unit for lowering the priority level is configured to lower:
   the priority level by two (2) levels.

3. The apparatus of claim 1 wherein the unit for lowering the priority level is further configured to prevent:
   said algorithm from being performed.

4. The apparatus of claim 1 further comprising:
   a unit for executing the selected algorithm when its priority level has been lowered to a lowest allowable priority and there is no other algorithm to choose.

5. The apparatus of claim 1 further comprising:
   a unit for searching for an algorithm with a priority lower than the priority of the selected algorithm after its priority is lowered to ease or cure the existing condition.

6. Apparatus for selecting an algorithm from a plurality of algorithms employed in a wireless communications system, each algorithm being provided to cure or ease a particular condition, comprising:
   a unit for assigning a priority level, taken from priority levels $P_1, P_2, P_3 \ldots P_n$, to each algorithm wherein priority level $P_n$ is a highest priority level;
   a unit for assigning a parameter to each algorithm wherein a same parameter is assigned to algorithms of a same priority level;
   a unit for selecting one of said algorithms for use;
   a unit for accumulating a number of times the selected algorithm has been consecutively selected and has failed to cure or ease a condition;
   a unit for maintaining the priority level of the selected algorithm and performing the selected algorithm when the accumulated number of times the algorithm has been consecutively selected is less than a predetermined number; and
   a unit for decreasing the priority level of the selected algorithm by at least two priority levels and updating priority parameters when the accumulated number equals the predetermined number.

7. The apparatus of claim 6, further comprising:
   a unit for halting changes of the assigned priority level of the selected algorithm when it is at a condition which is one of reaching its lowest permitted priority level and has its priority decreased a given number of times.

8. The apparatus of claim 7, further comprising:
   a unit for preventing selection of the algorithm.

9. The apparatus of claim 6 wherein the unit for decreasing the priority level is configured to wait:
   for selection of an algorithm with a new priority level.

10. The apparatus of claim 7, further comprising:
    a unit for determining if there is another algorithm to choose when neither condition of reaching its lowest permitted priority level and has its priority decreased a given number of times is achieved.

11. The apparatus of claim 10 further comprising:
the unit for assigning a priority level being configured to assign a priority level, taken from priority levels $P_1$, $P_2$, $P_3$ ... $P_n$, to each algorithm wherein the priority level $P_n$ is a highest priority level when there are no other algorithms to choose.

12. An apparatus for selecting an algorithm from a plurality of algorithms employed in a wireless communications system, each algorithm being provided to cure or ease a particular condition, comprising:
a unit for assigning a priority level, taken from priority levels $P_1$, $P_2$, $P_3$ ... $P_n$, to each algorithm wherein priority level $P_n$ is a highest priority level;
a unit for assigning a parameter to each algorithm wherein a same parameter is assigned to algorithms of a same priority level;
a unit for selecting an algorithm wherein, when two or more algorithms are associated with a given condition, that algorithm having a higher priority is selected;
an accumulator for accumulating a number of times an algorithm has been consecutively selected at a given priority level and has failed to cure a condition; and
a unit for increasing the priority level of the selected algorithm and updating the priority parameter when the selected algorithm has been selected a given number of times at its present priority level.

13. The apparatus of claim 12 wherein the unit for increasing the priority level of the selected algorithm when the selected algorithm has been selected a given number of times at its present priority level is configured to increase the priority level by two (2) levels.

14. The apparatus of claim 13 further including:
a unit for executing the selected algorithm.

15. Apparatus for selecting an algorithm from a plurality of algorithms employed in a wireless communications system, each algorithm being provided to cure or ease a particular condition, comprising:
a unit for assigning a priority level, taken from priority levels $P_1$, $P_2$, $P_3$ ... $P_n$, to each algorithm wherein priority level $P_n$ is a highest priority level;
a unit for assigning a parameter to each algorithm wherein a same parameter is assigned to algorithms of a same priority level;
a unit for selecting an algorithm for use;
a unit for accumulating a number of times the selected algorithm has been consecutively selected and has failed to cure or each a condition; and
a unit for increasing the priority level of the selected algorithm and updating the priority parameter when the accumulated number is at least equal to a given number.

16. Apparatus for selecting an algorithm from a plurality of algorithms employed in a wireless communications system, each algorithm being provided to cure or ease a particular condition, comprising:
a unit for assigning a priority level, taken from priority levels $P_1$, $P_2$, $P_3$ ... $P_n$, to each algorithm wherein priority level $P_n$ is a highest priority level;
a unit for assigning a parameter to each algorithm wherein a same parameter is assigned to algorithms of a same priority level;
a unit for selecting an algorithm wherein, when two or more algorithms are associated with a given condition, that algorithm having a higher priority is selected;
a unit for decreasing the priority level of the selected algorithm when it has been consecutively selected a given number of times and has failed to solve a problem;
a timer being set when the priority level of the selected algorithm has been decreased; and
a unit for increasing the priority level of the selected algorithm when the timer times out before the algorithm is selected.

17. Apparatus for selecting an algorithm from a plurality of algorithms employed in a wireless communications system, each algorithm being provided to cure or ease a particular condition, comprising:
a unit for assigning a priority level, taken from priority levels $P_1$, $P_2$, $P_3$ ... $P_n$, to each algorithm wherein priority level $P_n$ is a highest priority level;
a unit for assigning a parameter to each algorithm wherein a same parameter is assigned to algorithms of a same priority level;
a unit for selecting one of said algorithms for use;
an accumulator for accumulating a number of times the selected algorithm has been consecutively selected and has failed to cure or ease a condition; and
a unit for increasing the priority level of the selected algorithm when the number accumulated by said accumulator is at least equal to a given number.

* * * * *